(12) United States Patent
Gupta et al.

(10) Patent No.: US 10,951,479 B1
(45) Date of Patent: Mar. 16, 2021

(54) USER CONTROLLED FAULT DOMAINS

(71) Applicant: Amazon Technologies, Inc., Seattle, WA (US)

(72) Inventors: Diwakar Gupta, Seattle, WA (US); Johannes Stephanus Jansen Van Rensburg, Cape Town (ZA); Aletta Johanna Blanken, Seattle, WA (US); Christopher Sam Goosen, Seattle, WA (US); Bret Kiraly, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 16/201,084

(22) Filed: Nov. 27, 2018

(51) Int. Cl.
*G06F 15/177* (2006.01)
*H04L 12/24* (2006.01)
*H04L 12/751* (2013.01)

(52) U.S. Cl.
CPC ...... *H04L 41/0893* (2013.01); *H04L 41/5041* (2013.01); *H04L 45/02* (2013.01); *H04L 41/5096* (2013.01)

(58) Field of Classification Search
CPC ............ H04L 41/0893; H04L 41/5041; H04L 45/02; H04L 41/5096
See application file for complete search history.

(56) References Cited

U.S. PATENT DOCUMENTS

| 2013/0185436 | A1* | 7/2013 | Carlin | G06F 9/5011 709/226 |
| 2015/0139238 | A1* | 5/2015 | Pourzandi | H04L 45/64 370/392 |
| 2017/0168906 | A1* | 6/2017 | Wu | G06F 9/45558 |

* cited by examiner

*Primary Examiner* — Padma Mundur
(74) *Attorney, Agent, or Firm* — Nicholson De Vos Webster & Elliott LLP

(57) ABSTRACT

Techniques for managing fault domains using cells are described. An area of a provider network may be divided into multiple cells, with each cell representing a different fault domain of the area of the provider network. A customer can provide domain definitions for their service or application and a cell management service can use the domain definitions to place the infrastructure and compute resources underlying the customer's application or service in appropriate cells within an area of the provider network. In some embodiments, the domain definitions may be account-based, where the domain definition may be to place resources in different fault domains depending on the account they are associated with. Alternatively, the customer may tag resources with an identifier such that resources tagged with a first identifier may be placed in a first cell while resources tagged with a second identifier may be placed in a second cell.

20 Claims, 8 Drawing Sheets

USER CONTROLLED FAULT DOMAINS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for managing fault domains using cells are described. According to some embodiments, a provider network may include various "fault domains" along which failures may occur. Various systems and services within and provided by the provider may be organized along these domains so better control correlated failure. For example, these fault domains may include physical fault domains (e.g., power, network devices, etc.) and logical fault domains (e.g., control plane services, etc.). A given provider network may have many of these fault domains representing may different dimensions of how a fault may occur and what systems and services may be impacted by such a failure. High level representations of fault domains, such as dividing the provider network into multiple areas, and placement services may be used to enable customers to choose where their infrastructure and compute resources are to be placed to avoid correlated failure of their services. However, as provider networks have grown in size and customers fleets have grown in size, traditional placement techniques may provide insufficient control to customers over how to manage their services given the provider network's fault domains. In various embodiments, customers can specify logical domains which a cell management service can then align with the provider network's fault domains.

For example, an area of a provider network may be divided into multiple cells, with each cell representing a different fault domain of the area of the provider network. A customer can provide domain definitions for their service or application and a cell management service can use the domain definitions to place the infrastructure and compute resources underlying the customer's application or service in appropriate cells within an area of the provider network. If the cells of an area of the provider network are insufficient to provide the fault tolerance desired by the customer, the placement may fail, and the cell management service may provide a recommendation to place the customer's resources in multiple areas of the provider network. In some embodiments, the domain definitions may be account-based. For example, a customer may maintain multiple accounts with a provider network with different resources associated with different accounts. The domain definition may be to place resources associated with a first account in a different fault domain (e.g., cell) than resources in a second account. Additionally, or alternatively, the customer may tag their resources with a domain identifier. Resources tagged with a first domain identifier may be placed in a first cell while resources tagged with a second domain identifier may be placed in a second cell.

Figure 1:
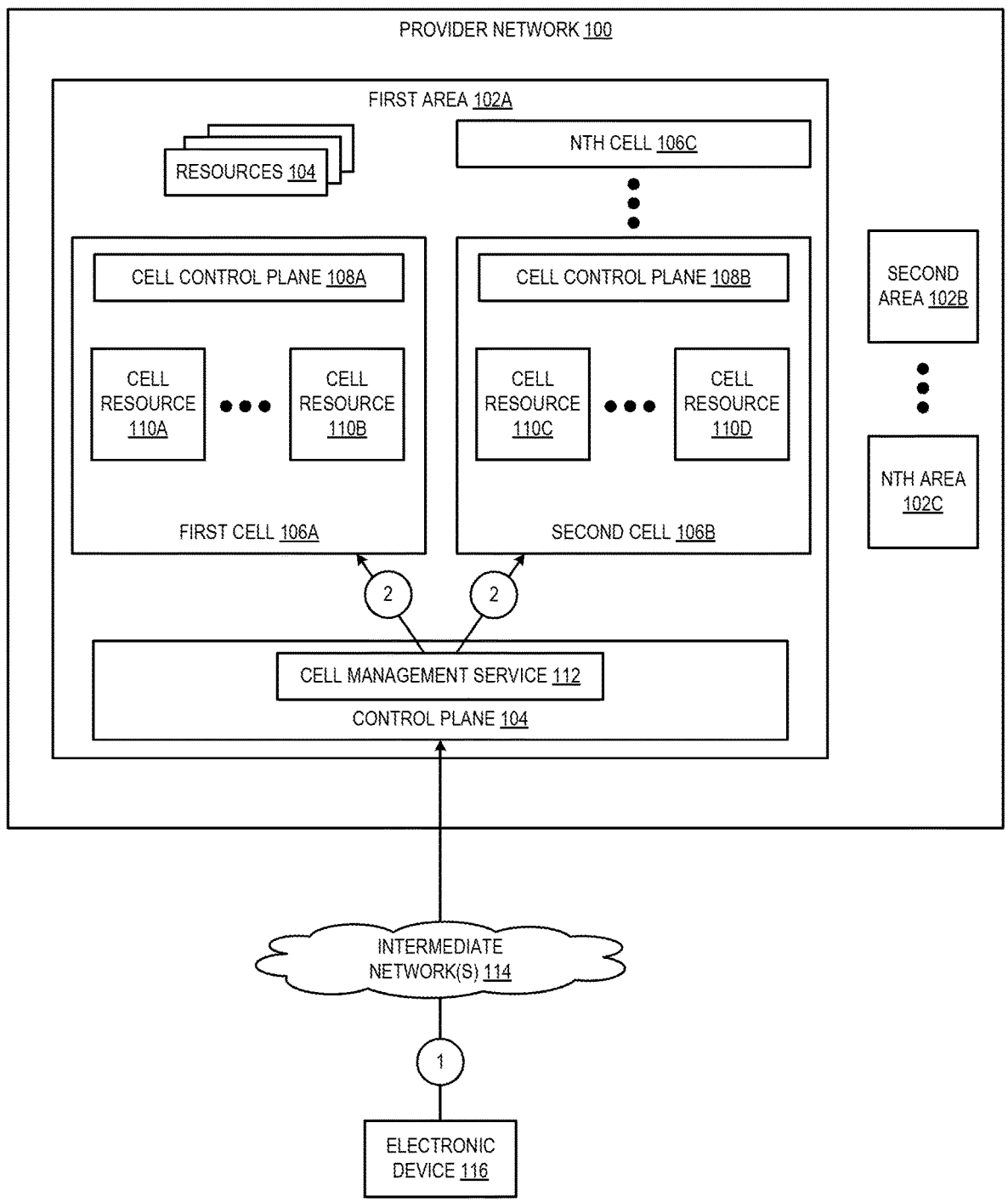
FIG. 1 is a diagram illustrating an environment for managing fault domains using cells according to some embodiments.

FIG. 1 is a diagram illustrating an environment for managing fault domains using cells according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 114 (e.g., the internal via one or more interface(s), such as through use of application programming interface (API) calls, via a console implemented as a website or application, etc. The interface(s) may be part of, or serve as a front-end to, a control plane 104 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a provider network 100 may make available various resources 104 and 110A-110D to users. For example, in FIG. 1, provider network 100 may include multiple areas, such as a first area 102A, a second area 102B, and an Nth area 102C. Each area may be logically and isolated from the other (and from any other areas not shown within provider network 100. For example, each area may be a distinct logical data center, supported by one or more physical data centers, and each area may have its own power supply and networking infrastructure to limit the likelihood of a failure in one area from affecting another area. In some embodiments, the first and second areas 102A and 102B may be located in the same region of provider network 100 which may include resources located in the same geographic area (e.g., state, country, etc.). By dividing provider network 100 into various regions and areas, the data and customer instances stored therein can be protected against failure events. For example, a failure in the first area 102A may not impact the resources in the second area 102B. Likewise, a failure in one geographic region may not affect resources located in another geographic region. To take advantage of these divisions, a user's resources in one area can be mirrored in a different area. As used herein, an area of a provider network may refer to a logically and/or geographically distinct portion of the provider network (e.g., different region, rack, aisle, floor, building, city, etc.).

Within any given area 102A-102C, additional fault domains may also exist. For example, physical servers that share a rack may be subject to correlated failure due to shared physical infrastructure such as power supplies, network switches, etc. Additionally, or alternatively, logical resources may be subject to correlated failure due to shared control planes, software stacks, etc., e.g., such that a bug or other error in one of these shared systems may lead to failure to all associated logical resources. Because of these various fault domains within an area of provider network 100, one portion of a user's application infrastructure deployed to a given area may fail while another portion does not. A given area may be divided into cells 106A-106C, which may each be defined along different fault domains within a given area 102A-102C. In some embodiments, resources may be subject to multiple fault domains, and therefore may be able to be grouped into multiple cells.

Control plane 104 can include a cell management service 112 to provide customers with more control over placement of their resources in fault domains of provider network 100. Each area 102A-102C of the provider network can be independent, supported by, e.g., geographically distinct data centers, such that a failure in one area is unlikely to affect another area. However, as discussed above, each area may include multiple fault domains. For example, a rack that includes multiple physical hosts may share a power supply or network switch, such that a failure in one of these components leads to a correlated failure of several physical hosts. As shown in FIG. 1, each cell 106A-106C may represent a different fault domain, including physical fault domains and logical fault domains. As shown, each cell may include an isolated cell control plane 108A-108B and resources that are included in that particular cell 110A-110D. Where a cell represents a physical fault domain, the cell resources may be those resources that are physically linked in the fault domain, such as physical hosts that share a network switch. Where a cell represents a logical fault domain, the cell resources may represent those resources that have been assigned to the cell and share software resources, such as cell control plane 108A. As discussed, resources may be included in a particular cell due to how the resources are deployed in provider network 100 and which fault domains the resources are subject to. Although resources are shown as being specific to a particular cell, in some embodiments resources may be included in multiple cells, due to those resources being subject to multiple fault domains.

In some embodiments, each cell may be independent of every other cell. As such, each cell may include its own control plane 108A-108B, resources 110A-110D, data stores, physical infrastructure (e.g., power supplies, switches, etc.). In some embodiments, data may be divided (e.g., sharded) across multiple cells, such that any given cell includes a portion of a customer's data. In some embodiments, some resources may span multiple cells. For example, a physical host may include an instance assigned to a first cell and a different instance assigned to a second cell. Such cells may represent logical fault domains. Additionally, such cells may be included in a third, larger cell that includes the first cell and the second cell. The third cell may represent a physical fault domain that encompasses the two logical fault domains represented by the first cell and the second cell.

A customer may choose to distribute their resources across multiple cells to either reduce the risk of correlated failure or to increase the likelihood that if one service of their application fails that the application fails. For example, an application that relies on e.g., three related services, may not be usable if any one of those services fail. By placing the underlying resources of those three services into the same cell, a failure of the cell causes the entire service to fail. The customer can indicate the fault domains of their application in various ways. For example, the customer can tag resources when those resources are created as belonging to a particular fault domain and are to be grouped together in a cell. In this example, each tag can be an indication of a fault domain, where resources having the same tag are to be added to the same fault domain. Additionally, or alternatively, a customer can indicate that resources belonging to a first account comprise a first fault domain and are to be grouped together in a particular cell, while resources belonging to a second account comprise a second fault domain. In some embodiments, the user may provide custom cell placement logic to determine a fault domain for each of the user's resources. The custom cell placement logic may output one or more fault domain indications, such as tags, that are associated with the user's resources.

As shown in FIG. 1, an electronic device 116 can send a request to a customer's application hosted by provider network 100. The request can be received by a cell management service 112, which may include a routing layer to identify to which resource of the customer's application the request is directed. As discussed further below, the routing layer may use information extracted from the request, such as an account identifier, a resource identifier, or a type of request, to determine the appropriate resource. The routing layer can then, at numeral 2, forward the request to the appropriate cell which includes the destination resource. By incorporating such a routing layer, the particular cell a given resource is in can be determined without requiring any knowledge on the part of the requestor as to where the destination resource is located. Additional details for setting up cells and assigning resources to those cells, as well as the routing layer, are described below with respect at least to FIGS. 2-4.

Figure 2:
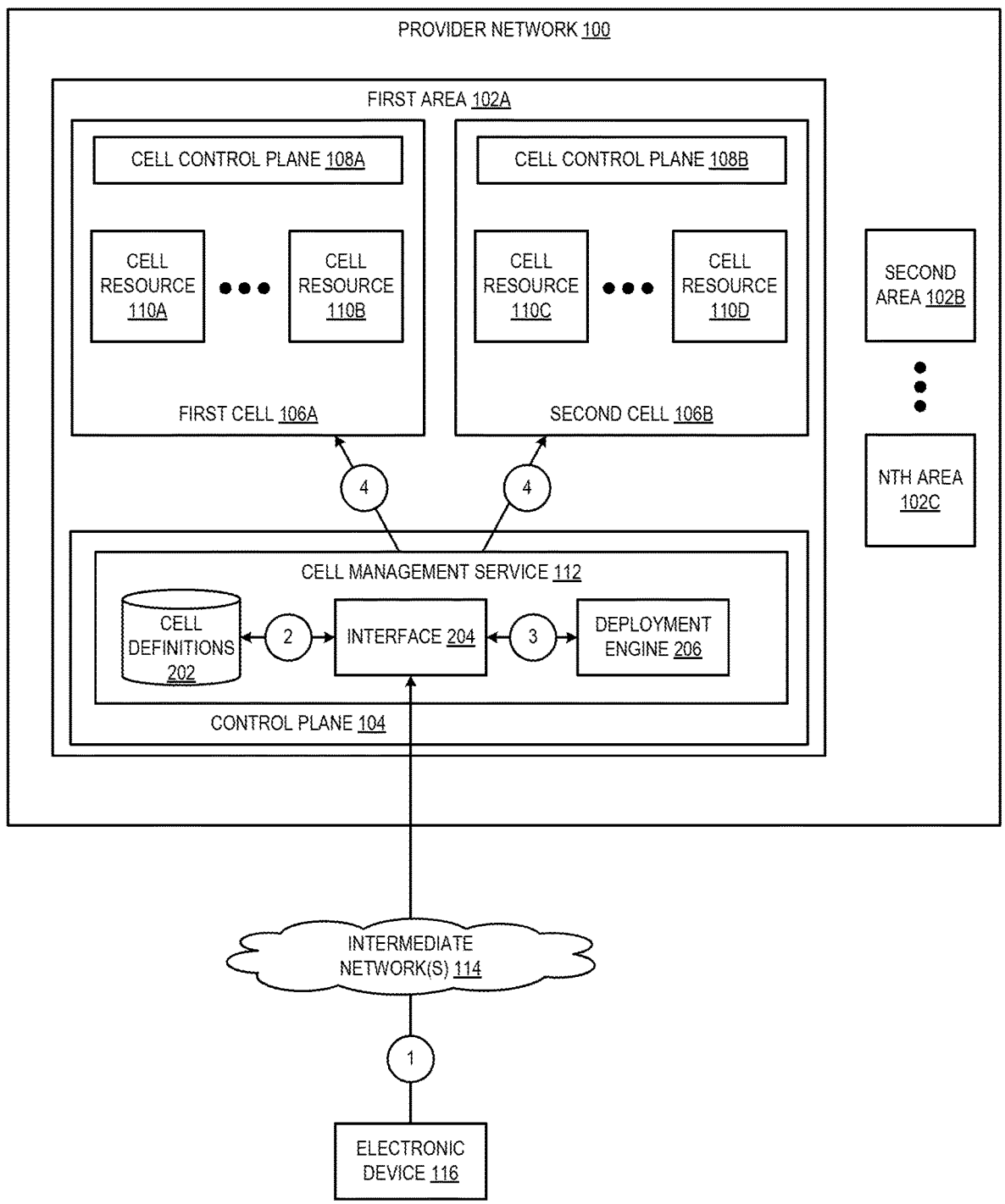
FIG. 2 is a diagram illustrating an environment for allocating resources to cells according to some embodiments.

FIG. 2 is a diagram illustrating an environment for allocating resources to cells according to some embodiments. As shown in FIG. 2, a control plane 104 can include a cell management service 112. The cell management service can include cell definitions 292, an interface 204, and a deployment engine 206. In some embodiments, a customer, using electronic device 116 can send a request at numeral 1 to add a resource in provider network 100. For example, the customer may be building one or more tiers of a hosted application and are adding resources to a given tier. The request can be received through interface 204, which may include a graphical user interface (GUI), console, application programming interface (API) or other interface. Although the interface is shown as part of cell management service 112, in some embodiments, the interface may be part of an application on electronic device 116. For example, an application may implement a software development kit provided by cell management service 112.

The interface 204 can provide one or more fault domains (e.g., cells 106A-106C) from which to choose. For example, at numeral 2, cell definitions 202 which identify one or more cells and include a description of the fault domain(s) that they represent may be retrieved through interface 204 and presented to the customer. The customer can then select the cell or cells representing the types of fault isolation desired for the new resource being added. Additionally, or alternatively, the customer can provide a fault domain identifier for the new resource (such as a tag, descriptor, or other data). The tag may be interpreted by cell management service 112 to indicate a customer's fault domain with which the new resource is to be associated. For example, resources having a first tag may be assigned to a first cell, while resources having a second tag may be assigned to a second cell. The fault domain identifier therefore enables the customer to specify which resources are to be fault isolated, without requiring the customer to specify specific fault domains for their resources. In some embodiments, if the cell management service cannot isolate the resources as indicated by the user, the cell management service can return a message indicating that the resources cannot be isolated. In some embodiments, the message may indicate alternative placements, such as in a different area of provider network 100 to provide similar fault isolation to that requested for the new resource. In some embodiments, the fault domain tags may be incorporated into an autoscaling group, such that when new instances are added to support a customer's application, those new instances are added according to the fault domain indicated by the tag.

At numeral 3, the deployment engine 206 can identify the appropriate cell 106A-106C to which to deploy the new resource. In some embodiments, the deployment engine can update a routing layer for the new resource corresponding to the identified cell for the new resource. At numeral 4, the cell management service 112 can deploy the resource to the appropriate cell. In some embodiments, for new the cell management service 112 can invoke a hardware virtualization service, storage service, or other resource provider service In some embodiments, the customer may provide custom cell placement logic to be implemented by cell management service 112. The custom logic may determine which fault domain a new resource should belong to based on, e.g., the type of resource, the tier of the customer's application to which it belongs, an identifier associated with the resource, the user creating the resource, or other entity, or other characteristics. The fault domains identified by the custom cell placement logic can then be used by the cell management service to determine a cell in which to place the new resource.

In some embodiments, a new cell may be created upon request and/or based on demand for isolated resources. A new cell can be created by adding an isolated data plane (e.g., one or more physical hosts) and an isolated cell control plane. Resources may then be assigned to the cell. In some embodiments, a range of resource identifiers may be used to assign specific resources to a particular cell. Once resources have been assigned, the routing layer may be updated to route traffic for the assigned resources to the new cell.

Figure 3:
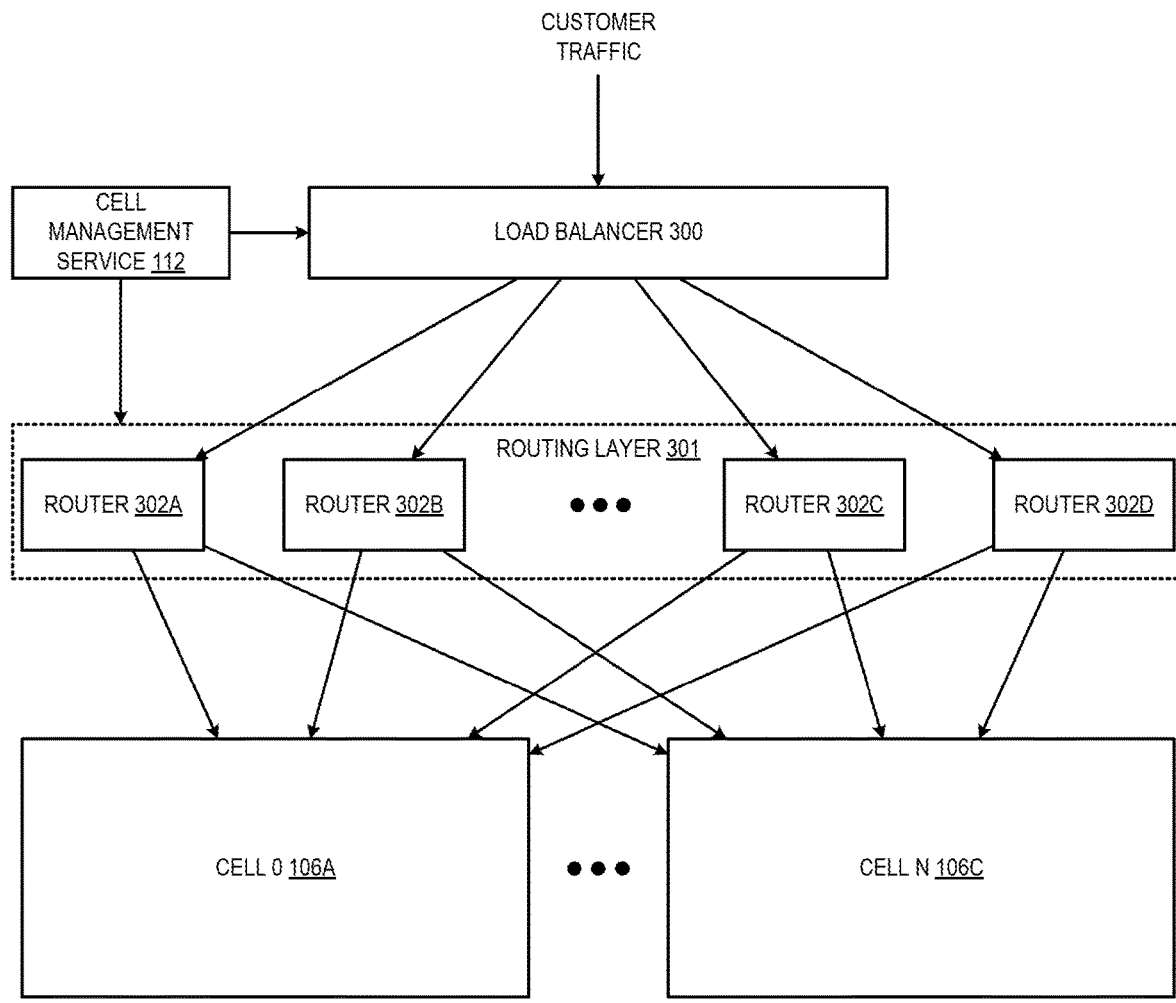
FIG. 3 is a diagram illustrating an environment for routing requests to cells according to some embodiments.

FIG. 3 is a diagram illustrating an environment for routing requests to cells according to some embodiments. As shown in FIG. 3, cell management service 112 can configured load balancer 300 and/or a routing layer 301, which may include a plurality of routers 302A-302D. Although routing layer 301 is depicted as separate from cell management service 112, in various embodiments, routing layer 301 may be included as part of cell management service 112 to implement the routing rules determined by cell management service 112. When customer traffic (e.g., one or more requests) is received, the load balancer 300 can identify an available router to which to forward the customer traffic. The router can then determine which cell 106A-106C to which to route the request.

In some embodiments, once a customer's resources have been divided into multiple cells, routing rules may be generated to enforce these divisions. In some embodiments, the routing rules may be received from the customer. Additionally, or alternatively, cell management service 112 can generate rules automatically based on the cells that have been created and the resources assigned to those cells. The rules may be pushed to the routing layer 301, where each router may use the rules to determine which cell 106A-106C to route the traffic to. In some embodiments, if the customer changes the fault domains of their application after the resources have been deployed, new routing rules may be created for resources going forward. In some embodiments, the new rules may be applied only to new resources and the old rules retained to route traffic to the preexisting resources. In some embodiments, the new rules may be applied to the pre-existing resources to determine whether the pre-existing resources comply with the new rules. If they do not, an alert may be sent to the customer indicating that the pre-existing resources may need to be migrated to a new cell to comply with the new rules. In some embodiments, pre-existing resources may be automatically migrated when new rules are propagated to ensure the pre-existing resources comply with the new rules.

By using a routing layer, the cell management service can create new cells as needed without updating clients to enable communication with those new cells. Instead, the routing layer can be responsible for classifying the request, identifying the service endpoints that the request must be forwarded to, and aggregating the results into a single response for the customer.

Figure 4:
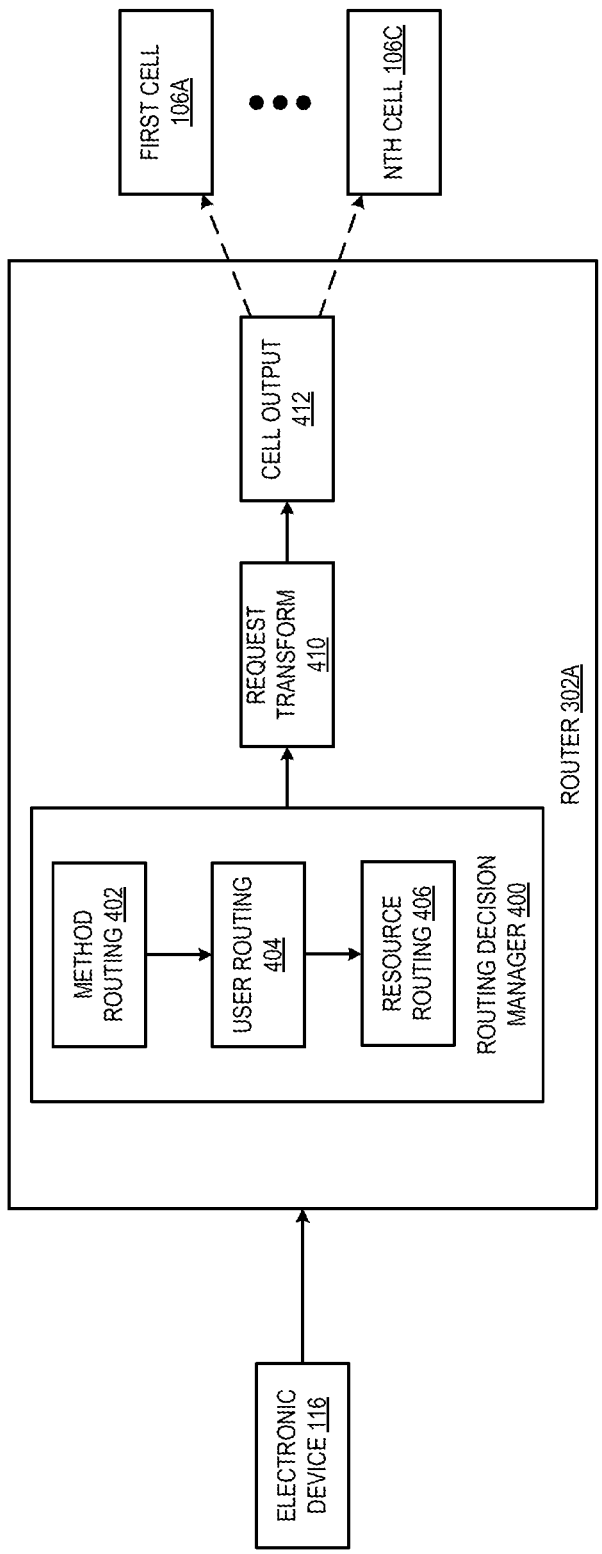
FIG. 4 is a diagram illustrating a router for cells in a provider network according to some embodiments.

FIG. 4 is a diagram illustrating a router for cells in a provider network according to some embodiments. As shown in FIG. 4, a request received from electronic device 116 can be passed to a router 302A. As discussed above, the request can be received by cell management service 112 and passed by a load balancer 300 to a router. The router 302A may include a routing decision manager 400, a request transform manager 410, and a cell output module 412.

Routing decision manager 400 can include a method routing decision block 402, a user routing decision block 404, and a resource routing decision block 406. The method routing decision block 402 can extract information about the request, such as a protocol associated with the request based on an inspection of the HTTP verb and headers. A method, or other command, associated with the request can be extracted and matched against, e.g., an API schema to identify a receiving service. User routing decision block 404 can identify an account identifier associated with the request. In some embodiments, resource routing decision block 406 can map one or more resource ranges associated with the request. This decision may be based on a resource identifier included with the request, or a data structure maintained by the routing decision manager that identifies one or more resources associated with the service identified by method routing decision block 402. Although three routing decision blocks are shown in the embodiment of FIG. 4, other logic may also be used to make a routing decision. For example, in some embodiments, cell health data may be received from a cell or from a monitoring layer that collects performance data for each cell. If a customer's resources are spread across multiple cells, and traffic may be routed to one of a plurality of the cells, then a cell health routing decision block may identify a cell to which to route the traffic based on the cell health data.

Once a routing decision has been made by routing decision manager 400, the request can be transformed, if necessary, to one or more distinct requests based on the service the request is destined for. Cell output module 412 can then pass the request or requests to the appropriate cell 106A-106C. In some embodiments, the requests may be made synchronously and as responses are received they are aggregated before returning a response to electronic device 116.

In some embodiments, traffic may be routed to two or more cells concurrently. Results may then be returned by one or more of the cells to a response transform, which can aggregate the results from the one or more cells into a single response that is returned to the electronic device. In some embodiments, the response may be aggregated after results have been returned from every cell of the one or more cells or a response may be aggregated after some subset of the cells have returned results, depending on the original request that was routed to the one or more cells.

Figure 5:
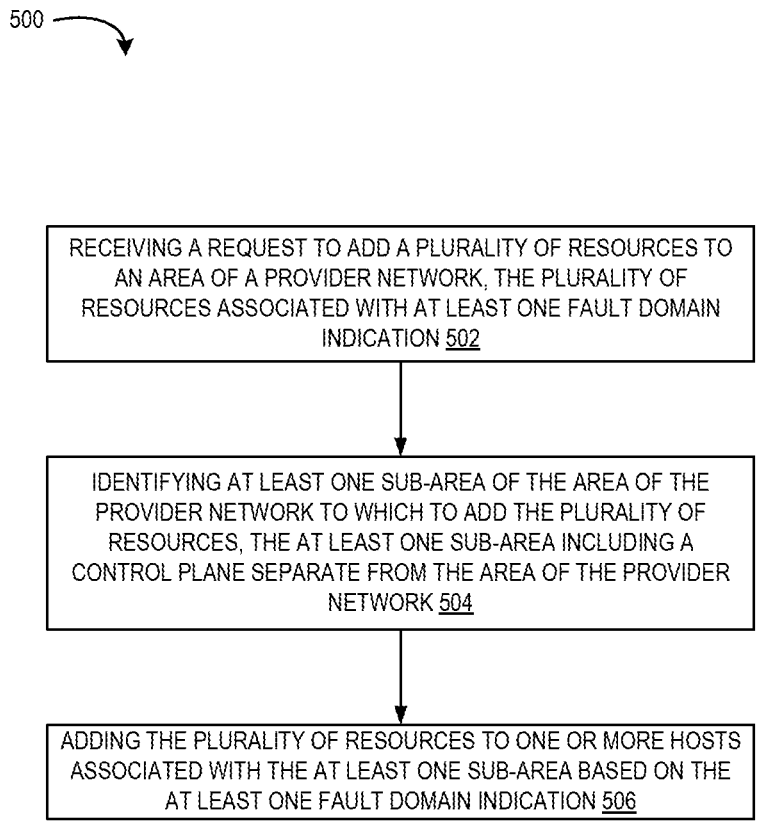
FIG. 5 is a flow diagram illustrating operations of a method for managing fault domains using cells according to some embodiments.

FIG. 5 is a flow diagram illustrating operations 500 of a method for managing fault domains using cells according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by cell manager 200 and/or routers 302A-C of the other figures.

The operations 500 include, at block 502, receiving a request to add a plurality of resources to an area of a provider network, the plurality of resources associated with at least one fault domain indication. The operations 500 include, at block 504, identifying at least one sub-area of the area of the provider network to which to add the plurality of resources, the at least one sub-area including a control plane separate from the area of the provider network. In some embodiments, identifying at least one sub-area may include receiving custom cell placement logic, the at least one fault domain indication determined using the custom cell placement logic.

The operations 500 include, at block 506, adding the plurality of resources to one or more hosts associated with the at least one sub-area based on the at least one fault domain indication. In some embodiments, adding the plurality of resources to one or more hosts associated with the at least one sub-area based on the at least one fault domain indication, may include adding a first subset of the plurality of resources to a first sub-area based on a first fault domain indication, and adding a second subset of the plurality of resources to a second sub-area based on a second fault domain indication, the first sub-area and the second sub-area each having separate control planes. In some embodiments, the first fault domain indication is a first account identifier and the second fault domain indication is a second account identifier. In some embodiments, adding the plurality of resources to one or more hosts associated with the at least one sub-area based on the at least one fault domain indication, may include identifying a sub-area tag associated with a first subset of the plurality of resources, the first subset of the plurality of resources corresponding to a plurality of related services, and adding the first subset of the plurality of resources associated with the sub-area tag to a same sub-area of the area of the provider network.

In some embodiments, the operations 500, may further include receiving network traffic associated with the plurality of resources, identifying the at least one sub-area associated with the plurality of resources, and routing the network traffic to the at least one sub-area. In some embodiments, identifying the at least one sub-area associated with the plurality of resources, may include determining at least one of an account identifier or a resource identifier associated with the network traffic, the at least one sub-area including the plurality of resources associated with the account identifier or the resource identifier.

In some embodiments, the operations 500, may further include providing a plurality of sub-area identifiers associated with a plurality of sub-areas of the area of the provider network, and the at least one fault domain indication includes at least one sub-area identifier. In some embodiments, the operations 500, may further include creating a new sub-area of the area of the provider network, adding a new control plane separate from the control plane associated with the sub-area, assigning a new plurality of resources to the new sub-area using resource identifiers associated with the new plurality of resources, and updating a plurality of routers in the area of the provider network to include routing rules associated with the new sub-area.

In some embodiments, the operations 500, may further include determining that the plurality of resources cannot be added to the at least one sub-area based on the indication that the first subset of resources and the second subset of resources are to be fault isolate, and rejecting the request to add the plurality of resources to the area of the provider network.

In some embodiments, the operations 500 may include receiving a request to add a plurality of resources to an area of a provider network, a first subset of resources associated with a first account identifier and a second subset of resources associated with a second account identifier, receiving an indication that the first subset of resources and the second subset of resources are to be fault isolated, identifying a first cell of the area of the provider network to which to add the first subset of resources, the first cell including a first control plane separate from the area of the provider network, identifying a second cell of the area of the provider network to which to add the second subset of resources, the second cell including a second control plane separate from the area of the provider network and the first control plane, adding the first subset of resources to the first cell and the second subset of resources to the second cell, providing a plurality of routing rules to a routing layer to route traffic destined to the first subset of resources to the first cell and traffic destined to the second subset of resources to the second cell, and routing traffic for the plurality of resources based on the plurality of routing rules.

Figure 6:
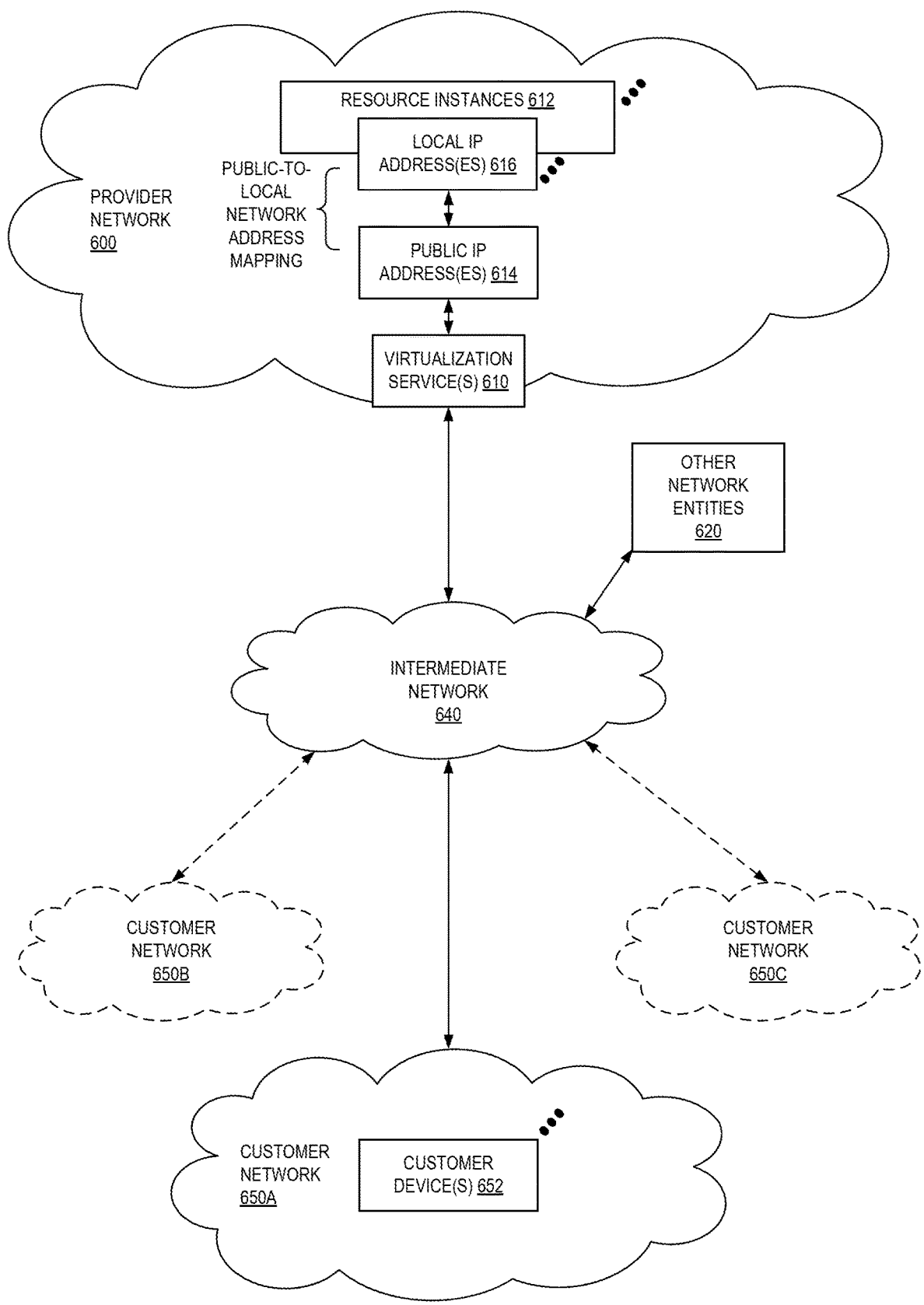
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
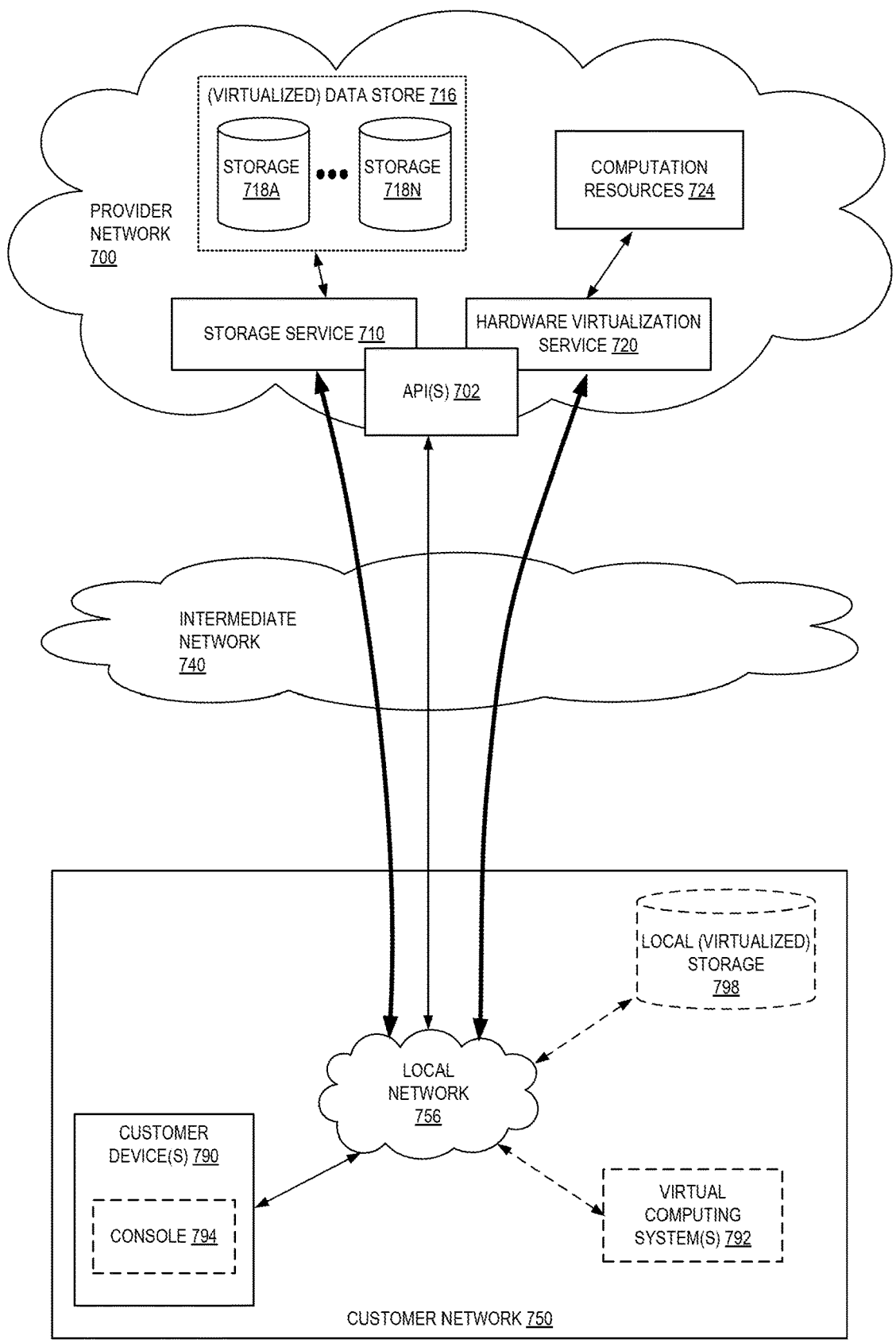
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
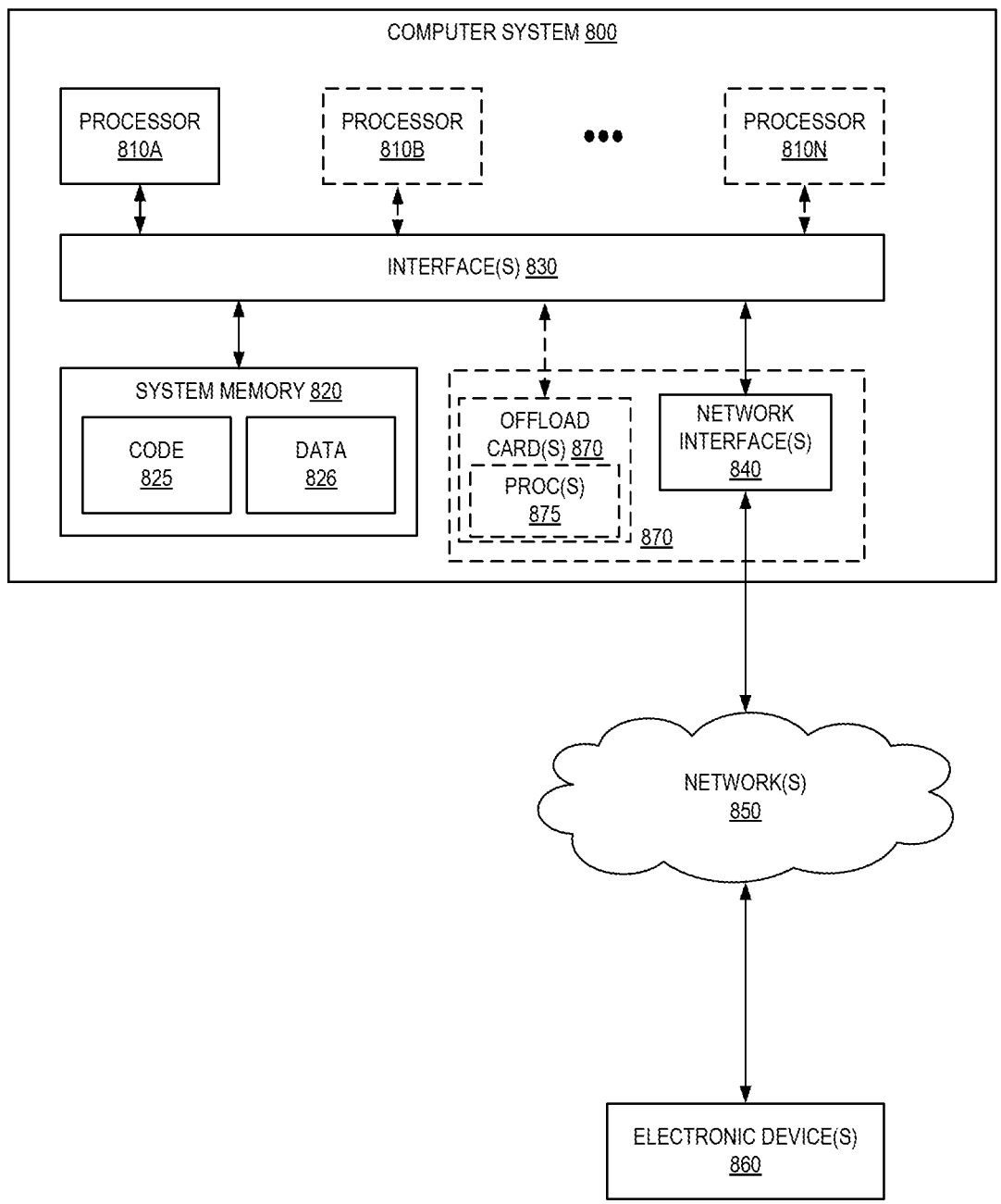
FIG. 8 is a block diagram illustrating an example computer system that may be used in some embodiments.

In some embodiments, a system that implements a portion or all of the techniques for managing fault domains using cells as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102C, 106A-106C, 108A-108B, 302A-302D) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to add a plurality of resources to an area of a provider network, a first subset of resources associated with a first account identifier of a user and a second subset of resources associated with a second account identifier of the user;
receiving an indication that the first subset of resources and the second subset of resources are to be fault isolated, wherein the area of the provider network includes a plurality of cells, wherein each cell represents a different physical or logical fault domain;
identifying a first cell of the area of the provider network to which to add the first subset of resources, the first cell including a first control plane separate from the area of the provider network, the first cell representing a logical fault domain;

identifying a second cell of the area of the provider network to which to add the second subset of resources, the second cell including a second control plane separate from the area of the provider network and the first control plane, the second cell representing a physical fault domain;

adding the first subset of resources to the first cell and the second subset of resources to the second cell;

providing a plurality of routing rules to a routing layer to route traffic destined to the first subset of resources to the first cell and traffic destined to the second subset of resources to the second cell; and routing traffic for the plurality of resources based on the plurality of routing rules.

2. The computer-implemented method of claim 1, further comprising:

creating a new cell in the area of the provider network, the new cell including an isolated control plane separate from the control plane associated with the first cell and the second cell;

assigning a new plurality of resources to the new cell using resource identifiers associated with the new plurality of resources; and updating the routing layer to include a new plurality of routing rules associated with the new cell.

3. The computer-implemented method of claim 1, further comprising:

determining that the plurality of resources cannot be added to the first or the second cell based on the indication that the first subset of resources and the second subset of resources are to be fault isolated; and rejecting the request to add the plurality of resources to the area of the provider network.

4. A computer-implemented method comprising:

receiving a request to add a plurality of resources associated with a user to an area of a provider network, the plurality of resources associated with at least one fault domain indication;

identifying at least one sub-area of the area of the provider network to which to add the plurality of resources, the at least one sub-area including a control plane separate from the area of the provider network, wherein the area of the provider network includes a plurality of sub-areas, wherein each sub-area represents a different fault domain; and adding a first subset of the plurality of resources associated with a first account identifier of the user to a first one or more hosts associated with a first sub-area based on a first fault domain indication and a second subset of the plurality of resources associated with a second account identifier of the user to a second one or more hosts associated with a logical sub-area based on a second fault domain indication.

5. The computer-implemented method of claim 4, wherein
the first sub-area and the second sub-area each have separate control planes.

6. The computer-implemented method of claim 5, wherein the first fault domain indication is the first account identifier and the second fault domain indication is the second account identifier.

7. The computer-implemented method of claim 4, wherein adding the plurality of resources to one or more hosts associated with the at least one sub-area based on the at least one fault domain indication, further comprises:

identifying a sub-area tag associated with a first subset of the plurality of resources, the first subset of the plurality of resources corresponding to a plurality of related services; and adding the first subset of the plurality of resources associated with the sub-area tag to a same sub-area of the area of the provider network.

8. The computer-implemented method of claim 4, further comprising:

receiving network traffic associated with the plurality of resources;

identifying the at least one sub-area associated with the plurality of resources; and routing the network traffic to the at least one sub-area.

9. The computer-implemented method of claim 8, wherein identifying the at least one sub-area associated with the plurality of resources, further comprises:

determining at least one of an account identifier or a resource identifier associated with the network traffic, the at least one sub-area including the plurality of resources associated with the account identifier or the resource identifier.

10. The computer-implemented method of claim 4, further comprising:

providing descriptions of a plurality of fault domains of the provider network; and receiving a selection of one or more of the plurality of fault domains, the selection corresponding to the at least one fault domain indication.

11. The computer-implemented method of claim 4, further comprising:

creating a new sub-area of the area of the provider network;

adding a new control plane separate from the control plane associated with the sub-area;

assigning a new plurality of resources to the new sub-area using resource identifiers associated with the new plurality of resources; and updating a plurality of routers in the area of the provider network to include routing rules associated with the new sub-area.

12. The computer-implemented method of claim 4, wherein identifying at least one sub-area of the area of the provider network to which to add the plurality of resources, the at least one sub-area including a control plane separate from the area of the provider network, further comprises:

receiving custom cell placement logic, the at least one fault domain indication determined using the custom cell placement logic.

13. A system comprising:

a plurality of sub-areas of an area of a provider network implemented by a first one or more electronic devices wherein each sub-area represents a different fault domain within the area; and a cell management service implemented by a second one or more electronic devices, the cell management service including instructions that upon execution cause the cell management service to:

receive a request to add a plurality of resources associated with a user to an area of a provider network, the plurality of resources associated with at least one fault domain indication;

identify at least one sub-area of the area of the provider network to which to add the plurality of resources, the at least one sub-area including a control plane separate from the area of the provider network; and add a first subset of the plurality of resources associated with a first account identifier of the user to a first one or more hosts associated with a first sub-area based on a first fault domain indication and a second subset of the plurality of resources associated with a second account identifier of the user to a second one or more hosts associated with a logical sub-area based on a second fault domain indication.

14. The system of claim 13, wherein
the first sub-area and the second sub-area each have separate control planes.

15. The system of claim 14, wherein the first fault domain indication is the first account identifier and the second fault domain indication is the second account identifier.

16. The system of claim 13, wherein to add the plurality of resources to one or more hosts associated with the at least one sub-area based on the at least one fault domain indication, the instructions, when executed, further cause the cell management service to:
    identify a sub-area tag associated with a first subset of the plurality of resources, the first subset of the plurality of resources corresponding to a plurality of related services; and
    add the first subset of the plurality of resources associated with the sub-area tag to a same sub-area of the area of the provider network.

17. The system of claim 13, wherein the instructions, when executed, further cause the cell management service to:
    receiving network traffic associated with the plurality of resources;
    identifying the at least one sub-area associated with the plurality of resources; and
    routing the network traffic to the at least one sub-area.

18. The system of claim 17, wherein to identify the at least one sub-area associated with the plurality of resources, the instructions, when executed, further cause the cell management service to:
    determine at least one of an account identifier or a resource identifier associated with the network traffic, the at least one sub-area including the plurality of resources associated with the account identifier or the resource identifier.

19. The system of claim 13, wherein the instructions, when executed, further cause the cell management service to:
    provide descriptions of a plurality of fault domains of the provider network;
    receiving a selection of one or more of the plurality of fault domains, the selection corresponding to the at least one fault domain indication.

20. The system of claim 13, wherein the instructions, when executed, further cause the cell management service to:
    create a new sub-area of the area of the provider network;
    add a new control plane separate from the control plane associated with the sub-area;
    assign a new plurality of resources to the new sub-area using resource identifiers associated with the new plurality of resources; and
    update a plurality of routers in the area of the provider network to include routing rules associated with the new sub-area.

* * * * *